Sept. 27, 1966  H. HOENICK  3,275,313
STABILIZER FOR VEHICLES
Filed Dec. 4, 1963
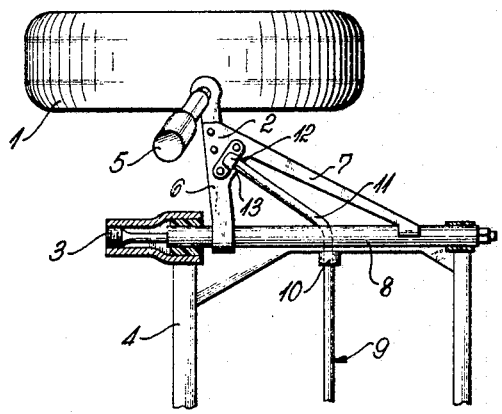
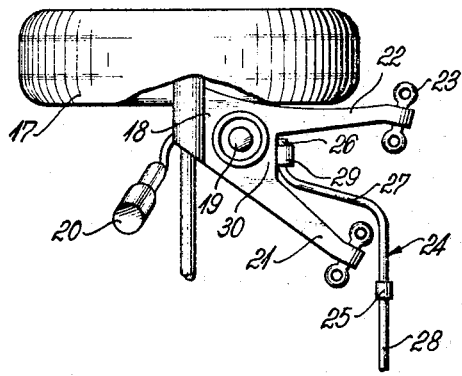
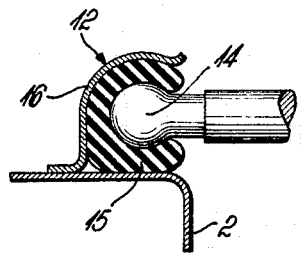
INVENTOR
Hans HÖNICK
BY
Dicke + Craig
his ATTORNEYS United States Patent Office 3,275,313
Patented Sept. 27, 1966

3,275,313
STABILIZER FOR VEHICLES
Hans Hoenick, Gerlingen, near Stuttgart, Germany, assignor to Firma Dr. Ing. h.c. F. Porsche KG, Stuttgart-Zuffenhausen, Germany
Filed Dec. 4, 1963, Ser. No. 328,028
Claims priority, application Germany, Dec. 13, 1962, P 30,762; Dec. 15, 1962, P 30,786
7 Claims. (Cl. 267—11)

The present invention relates to a stabilizer arrangement for vehicles, especially motor vehicles with fork-shaped wheel guide members, whereby the stabilizer constructed as torsion rod is arranged transversely to the driving direction and is angularly bent at the ends thereof to form crank arms.

Wheel suspensions are already known in the prior art in which the crank arms of the stabilizer are pivotally connected to the arms of the forked-shaped wheel guide members. Since in these prior art arrangements the crank arms extend adjacent to the wheel guide members, all of these prior art constructions entail the disadvantage of very large space requirements.

According to the present invention, these disadvantages are avoided in that the crank arms of the stabilizer extend between the arms of the fork-shaped wheel guide members and are pivotally connected to the root of the arms. A spatially favorable arrangement is achieved thereby with a relatively large effective lever arm of the stabilizer and more space is created for the accommodation of the remaining units of the vehicle such as, for example, the steering linkage. Advantageously, the crank arms of the stabilizer are provided at the ends thereof near the wheel guide members with ball-shaped heads embedded in bushings or sockets made of plastic material, rubber or the like. Such an arrangement produces a simple, service-free and easily exchangeable pivotal connection of the crank arm of the stabilizer at the guide member. Furthermore, it is possible that the ends of the crank arms of the stabilizer near the wheel guide members are angularly bent in such a manner that they extend at least substantially parallel to the center part of the stabilizer and are pivotally connected to the guide member by means of rubber bearings or the like.

Accordingly, it is an object of the present invention to provide a stabilizer arrangement for vehicles, especially for motor vehicles, of the type described hereinabove which eliminate by simple means the shortcomings and drawbacks encountered with the prior art constructions.

It is another object of the present invention to provide a stabilizer arrangement including a torsion rod which reduces the space requirements for the pivotal connections of the stabilizer arms with the wheel guide structures.

A further object of the present invention resides in the provision of a stabilizer arrangement for motor vehicles which not only produces an effectively large lever arm, but also an extremely compact and space-saving connection of the stabilizer ends with the wheel guide members.

A still further object of the present invention resides in the provision of particularly advantageous pivotal connections for the ends of the stabilizer arms with the wheel guide structures which are simple in construction, require practically no service and maintenance, and may be readily exchanged in case of need.

These and further objects, features and advantages of the present invention will become more obvious from the following description when taken in connection with the accompanying drawing which shows, for purposes of illustration only, two embodiments in accordance with the present invention, and wherein FIGURE 1 is a plan view on a suspension for steerable wheels of one side of the vehicle with wheels guided by means of fork-shaped transverse guide members and provided with a stabilizer arrangement in accordance with the present invention;

FIGURE 2 is a partial cross sectional view, on an enlarged scale, of the mounting end securing arrangement for the ends of the stabilizer arms in the vicinity of the guide members, and FIGURE 3 is a plan view of a modified embodiment of a stabilizer arrangement in accordance with the present invention which is particularly suitable for driven wheels.

Referring now to the drawing wherein like reference numerals are used throughout the various views to designate like parts, and more particularly to the wheel suspension illustrated in FIGURE 1, the wheel designated therein by reference numeral 1 is guided by means of a guide structure 2 constructed as transverse guide member and forming part of the wheel suspension of a motor vehicle for steerable wheels. A torsion rod spring 3 arranged parallel to the vehicle longitudinal axis serves for the spring-support of the wheel 1, which torsion rod spring 3 is supported on the frame 4 of the vehicle in a conventional manner. A shock absorber 5 which is supported at the vehicle superstructure by means of a bearing support (not illustrated) is provided for the vertical guidance of the wheel 1. The guide member 2 consists of two arms 6 and 7 by means of which it acts by way of a tubular member 8, which is supported at the frame 4, on the torsion rod spring 3 in a known, conventional manner.

A stabilizer generally designated by reference numeral 9 which is disposed transversely to the vehicle longitudinal axis and is constructed as torsion rod spring serves for the stabilization of the vehicle. The stabilizer 9 is supported on both sides of the frame 4 by means of brackets 10 or the like of conventional construction. The ends of the stabilizer 9 are angularly bent and form crank arms 11. The crank arms 11 extend between the two arms 6 and 7 of a respective guide member 2. The ends of the crank arms 11 are pivotally connected to the root 13 of the guide member 2 by means of a ball joint generally designated by reference numeral 12. The joint 12 (FIG. 2) disposed at the end of the crank arm 11 of the stabilizer 9 near the guide member 2 consists of a ball-shaped member 14 secured at the crank arm 11 which is supported within an elastic bushing or socket 15. The rubber bushing or socket 15 may be made of plastic material, rubber, or the like. The elastic bushing 15 is secured at the guide member 2 by means of a clamp or lug 16 surrounding the same.

FIGURE 3 illustrates a modified embodiment of the present invention which is suited for the driven wheels, that is, for the most part, for a rear wheel suspension. The wheel 17 is guided by means of a guide structure 18 constructed as longitudinal guide member. The guide member 18 includes arms 21 and 22 and is pivotally connected at the vehicle superstructure by means of clamp or lugs 23. A coil spring or pneumatic spring 19 in combination with a shock absorber 20 serves for the spring-support of the wheel. The shock absorber 20 serves simultaneously for the vertical support of the wheel 17. A stabilizer generally designated by reference numeral 24 is provided for stabilizing the vehicle which is again constructed as torsion rod and is disposed transversely to the vehicle longitudinal axis. The stabilizer 24 is retained at the vehicle body by means of brackets 25. The ends of the stabilizer 24 are angularly bent and form crank arms 27 which extend between the arms 21 and 22 of the guide member 18. The crank arms 27 are angularly bent essentially parallel to the stabilizer torsion rod 28 at the ends 26 thereof near the wheel guide members 2 and are pivotally connected to the root 30 of the arms 21 and 22 of the guide member 18 by means of a bearing support 29 or by means of a linkage (not shown).

While I have shown and described two embodiments in accordance with the present invention, it is understood that the same is not limited thereto, but is susceptible of numerous changes and modifications as shown to a person skilled in the art, and I therefore do not wish to be limited to the details shown and described herein, but intend to cover all such changes and modifications are encompassed by the scope of the appended claims.

I claim:

1. A stabilizer arrangement for vehicles, especially motor vehicles having a vehicle superstructure, comprising integral fork-like wheel guide members, each including first and second arms diverging in V-shape and pivotally connected at spaced points to the vehicle superstructure for suspending a respective wheel at the vehicle superstructure, and stabilizer means for stabilizing the vehicle and operatively connecting oppositely disposed wheel guide members, said stabilizer means being constructed as a torsion rod provided with crank arms, each extending entirely between the arms of the corresponding fork-like wheel guide member, and means pivotally connecting each crank arm of the stabilizer means at the root of the arms of the corresponding fork-like wheel guide member.

2. A stabilizer arrangement for vehicles, especially motor vehicles having a vehicle superstructure, comprising fork-like wheel guide members, each including first and second arms diverging in V-shape and pivotally connected at spaced points to the vehicle superstructure for suspending a respective wheel at the vehicle superstructure, and stabilizer means for stabilizing the vehicle and operatively connecting oppositely disposed wheel guide members, said stabilizer means being constructed as a torsion rod provided with crank arms, each extending substantially entirely between vertical parallel planes through the points of pivotal connection of the arms of the corresponding fork-like wheel guide member at the vehicle superstructure, and means pivotally connecting each crank arm of the stabilizer means at the root of the arms of the corresponding fork-like wheel guide member, each crank arm of said stabilizer means being provided with ball-shaped means at the end thereof near the corresponding wheel guide member, and elastic bushing means at least partially surrounding said ball-shaped means for supporting said ball-shaped means at said wheel guide member.

3. A stabilizer arrangement for vehicles, especially motor vehicles having a vehicle superstructure, comprising fork-like wheel guide members, each including first and second arms diverging in V-shape and pivotally connected at spaced points to the vehicle superstructure for suspending a respective wheel at the vehicle superstructure, and stabilizer means for stabilizing the vehicle and operatively connecting oppositely disposed wheel guide members, said stabilizer means being constructed as a torsion rod provided with crank arms, each extending substantially entirely between the arms of the corresponding fork-like wheel guide member, and means pivotally connecting each crank arm of the stabilizer means at the root of the arms of the corresponding fork-like wheel guide member, the ends of the crank arms of the stabilizer means being angularly bent in such a manner that they extend at least approximately parallel to the center part of the stabilizer means.

4. A stabilizer arrangement for vehicles, especially motor vehicles having a vehicle superstructure comprising, fork-like wheel guide members, each including first and second arms diverging in V-shape and pivotally connected at spaced points to the vehicle superstructure for suspending a respective wheel at the vehicle superstructure, and stabilizer means for stabilizing the vehicle and operatively connecting oppositely disposed wheel guide members, said stabilizer means being constructed as a torsion rod provided with crank arms, each extending substantially entirely between the arms of the corresponding fork-like wheel guide member, and means pivotally connecting each crank arm of the stabilizer means at the root of the arms of the corresponding fork-like wheel guide member, each crank arm of said stabilizer means being provided with ball-shaped means at the end thereof near the corresponding wheel guide member, and elastic bushing means at least partially surrounding said ball-shaped means for supporting said ball-shaped means at said wheel guide member, the ends of the crank arms of the stabilizer means being angularly bent in such a manner that they extend at least approximately parallel to the center part of the stabilizer means.

5. In a stabilizer arrangement for vehicles, especially motor vehicles having integral substantially fork-shaped wheel guide members, each provided with guide arms diverging in V-shape and pivotally connected at spaced points to the vehicle superstructure, and in which the stabilizer is constructed as a torsion rod, extends substantially transversely to the driving direction and is angularly bent at the ends thereof to form crank arms operatively connected to oppositely disposed wheel guide members, the improvement consisting essentially of each torsion rod stabilizer crank arms extending substantially entirely between the arms of the corresponding fork-shaped wheel guide member, and means pivotally connecting each crank arm to the corresponding wheel guide member in the vicinity of the root of the arms thereof.

6. In a stabilizer arrangement for vehicles especially motor vehicles having integral substantially fork-shaped wheel guide members, each provided with guide arms diverging in V-shape and pivotally connected at spaced points to the vehicle superstructure, and in which the stabilizer is constructed as a torsion rod, extends substantially transversely to the driving direction and is angularly bent at the ends thereof to form crank arms, operatively connected to oppositely disposed wheel guide members, the improvement essentially consisting of each torsion rod stabilizer crank arm extending substantially entirely between the arms of the corresponding fork-shaped wheel guide member, and means pivotally connecting each crank arm to the corresponding wheel guide member in the vicinity of the root of the arms thereof, and the ends of said crank arms being angularly bent in such a manner that they extend approximately parallel to the transverse center part of the stabilizer means.

7. In a stabilizer arrangement for vehicles, especially motor vehicles having integral substantially fork-shaped wheel guide members, each provided with guide arms diverging in V-shape and pivotally connected at spaced points to the vehicle superstructure, and in which the stabilizer is constructed as a torsion rod, extends substantially transversely to the driving direction and is angularly bent at the ends thereof to form crank arms operatively connected to oppositely disposed wheel guide members, the improvement essentially consisting of each torsion rod stabilizer crank arm extending substantially entirely between the arms of the corresponding fork-shaped wheel guide member, and means pivotally connecting each crank arm to the corresponding wheel guide member in the vicinity of the root of the arms thereof, said pivotal connecting means including ball-shaped means near the end of each crank arm and elastic socket means receiving therein said ball-shaped means.

References Cited by the Examiner

UNITED STATES PATENTS

| | | | |
|---|---|---|---|
| 2,529,806 | 11/1950 | Konopka et al. | 267—20 |
| 2,674,450 | 4/1954 | Frank | 267—11 |
| 2,753,007 | 7/1956 | Read | 267—11 X |
| 2,961,253 | 11/1960 | Allison | 267—11 X |
| 2,972,489 | 2/1961 | Collier et al. | 267—20 X |
| 2,998,241 | 8/1961 | Eyb | 267—57 |
| 3,017,196 | 1/1962 | McFarland | 280—124.3 |
| 3,113,787 | 12/1963 | Lauderdale | 267—8 X |

FOREIGN PATENTS 602,079  2/1960  Italy.

ARTHUR L. LA POINT, *Primary Examiner.*

W. B. WILBUR, R. M. WOHLFARTH,
*Assistant Examiners.*